3,442,006
PROCESS FOR WELDING OR BRAZING TWO MEMBERS OF WHICH AT LEAST ONE IS MADE OF GRAPHITE
Lucien Robert Guichet, Petit Clamart, and Georges Jacques Gotoghian, Paris, France, assignors to Societe Nationale d'Etude et de Construction de Moteurs d'Aviation, Paris, France, a company of France
No Drawing. Filed Dec. 12, 1963, Ser. No. 329,945
Claims priority, application France, Dec. 17, 1962, 918,873
Int. Cl. B23k *31/02*
U.S. Cl. 29—472.7      4 Claims The invention relates to an improved process for welding or brazing two members of which at least one is made of graphite.

Various processes are already known for welding or brazing carbon or graphite members with materials of the same nature, or with refractory metals and alloys. However, these known processes do not allow temperatures of the order of 1800° K. to be exceeded in the use of the welded assembly.

The present invention has as its principal object, to provide a process which will enable a welded or brazed assembly to be produced, which will withstand temperatures of use of the order of 2800° K. The invention therefore provides a process for joining, in particular by welding or brazing, two graphite members, or one graphite member and one member made of a refractory material such as tungsten, molybdenum, zironium, hafnium, tantalum, titanium or niobium or a nitride, carbide or boride of one of these metals.

In accordance with the present invention, one forms on the surface of the members, before they are brought into contact and united, a fixative intermediate layer consisting of a mixture of one or more of the said refractory materials and one or more metals of the group constituted by ruthenium, rhodium, palladium, osmium, iridium and platinum.

These latter metals of the platinum group are present in the mixture in a proportion varying from 1 to 50% by mass (with the exclusion of eutectic mixtures) according to:

the nature of the elements to be assembled together,
the temperature of use of the assembly, the above-mentioned proportion being smaller according as the temperature of use is higher,
the desired fusibility of the mixture used for welding or brazing, this fusiblity being the greater as the above-mentioned proportion is increased.

Apart from the relatively low melting temperature (varying from 2000 to 3000° K. from case to case) the mixture constituting the intermediate layer of the invention presents numerous advantages, in particular:

good wetting effect relatively to graphite,
rapid diffusion of its constituents into the interior of the graphite and of the refractory material, on account of physico-chemical reaction.

The welding or brazing of the members to be assembled takes place by heating in a furnace under vacuum or under a controlled atmosphere, either with previous formation of the fixative intermediate layer on one or both of the members to be assembled, followed by welding by bringing the members together, or by direct welding with the interposition, between the two surfaces to be assembled, of a deposit of the mixture chosen for forming the intermediate layer.

The present invention has a particularly important application in connection with the assembly of the elements forming the neck of a rocket nozzle or the parts of a nuclear reactor.

We claim:

1. Process for welding-brazing a graphite member to a member made from graphite or a refractory material selected from the group consisting of tungsten, molybdenum, zirconium, halfnium, tantalum, titanium and niobium, and the nitrides, carbides and borides of these metals, said process including the steps of interposing between surfaces of said members which are to be united a fixative intermediate layer consisting of a mixture of (1) at least one refractory material selected from the said group together with (2) at least one metal selected from the group consisting of ruthenium, rhodium, palladium, osmium, iridium and platinum, wherein the metal of the latter group is present in the mixture in a proportion between 1% and 50% by mass, eutectic mixtures being excepted, bringing said members together and heating to an elevated temperature.

2. Process for welding-brazing a graphite member to a member made from a refractory material selected from the group consisting of tungsten, molybdenum, zirconium, hafnium, tantalum, titanium and niobium, and the nitrides, carbides and borides of these metals, said process including the steps of interposing between surfaces of said members which are to be united a fixative intermediate layer consisting of a mixture of (1) at least one refractory material selected from the said group together with (2) at least one metal selected from the group consisting of ruthenium, rhodium, palladium, osmium, iridium and platinum, wherein the metal of the latter group is present in the mixture in a proportion between 1% and 50% by mass, eutectic mixtures being excepted, bringing said members together and heating to an elevated temperature.

3. A process according to claim 1, wherein said intermediate layer is formed by depositing said mixture on at least one of said members, said members being brought together and heated in a furnace, under vacuum or under a controlled atmosphere, so as to weld them together.

4. A process according to claim 1, wherein the intermediate layer is formed by depositing said mixture between said surfaces to be united, said members being welded together directly in a furnace, under vacuum or under a controlled atmosphere.

References Cited

UNITED STATES PATENTS

| | | | |
|---|---|---|---|
| 2,835,967 | 5/1958 | Umblia | 29—472.7 |
| 3,122,424 | 2/1964 | King | 29—473.1 X |
| 3,196,536 | 7/1965 | Knippenberg et al. | 29—473.1 X |
| 3,224,071 | 12/1965 | Levi et al. | 29—498 X |

JOHN F. CAMPBELL, *Primary Examiner.*

R. F. DROPKIN, *Assistant Examiner.*

U.S. Cl. X.R.

29—195, 473.1